United States Patent [19]
Guezou et al.

[11] Patent Number: 6,131,114
[45] Date of Patent: Oct. 10, 2000

[54] SYSTEM FOR INTERCHANGING DATA BETWEEN DATA PROCESSOR UNITS HAVING PROCESSORS INTERCONNECTED BY A COMMON BUS

[75] Inventors: Jean Adrien Guezou, Lannion; Marcel Ollivier, Ploulec'h; Bernard Paris, Lannion, all of France

[73] Assignee: Alcatel, Paris, France

[21] Appl. No.: 09/187,086

[22] Filed: Nov. 5, 1998

[30] Foreign Application Priority Data

Nov. 6, 1997 [FR] France .................................. 97 13949

[51] Int. Cl.⁷ .................................................. G06F 13/00
[52] U.S. Cl. ........................................... 709/216; 710/129
[58] Field of Search ................................... 709/213–216; 710/100, 105, 129; 713/400, 500, 600

[56] References Cited

U.S. PATENT DOCUMENTS

| | | | |
|---|---|---|---|
| 4,814,980 | 3/1989 | Peterson et al. | 709/216 |
| 5,577,229 | 11/1996 | Wakerly | 711/147 |
| 5,675,829 | 10/1997 | Oskouy et al. | 710/6 |
| 5,887,138 | 3/1999 | Hagersten et al. | 709/215 |

FOREIGN PATENT DOCUMENTS 0 320 607 A2  6/1989  European Pat. Off. .
0 646 876 A1  4/1995  European Pat. Off. .

OTHER PUBLICATIONS

Patent Abstracts of Japan, vol. 18, No. 232 (P–1731) Apr. 27, 1994 corresponding to JP 06 019785 A (Matsushita Electric Ind. Co., Ltd.) Jan. 28, 1994.

*Primary Examiner*—Paul R. Myers
*Attorney, Agent, or Firm*—Sughrue, Mion, Zinn, Macpeak & Seas, PLLC

[57] ABSTRACT

A system for interchanging data between "agent" data processor units including processing means such as processors. Units are interconnected by an external multiwire interchange bus common to said units, with sharing the bus being orchestrated by an arbitrator. Each unit has storage means in which data is stored in an organized manner at determined addresses enabling the data to be read and/or written on demand. The whole formed by said units includes data storage means constituting a distributed interchange memory assembly common to all of the units and accessible by all of them via the interchange bus. Each unit contains a portion of the means of the assembly, constituted by an interchange memory which is accessible by the processor means of the unit, and by the processor means of another unit via the interchange bus.

6 Claims, 3 Drawing Sheets

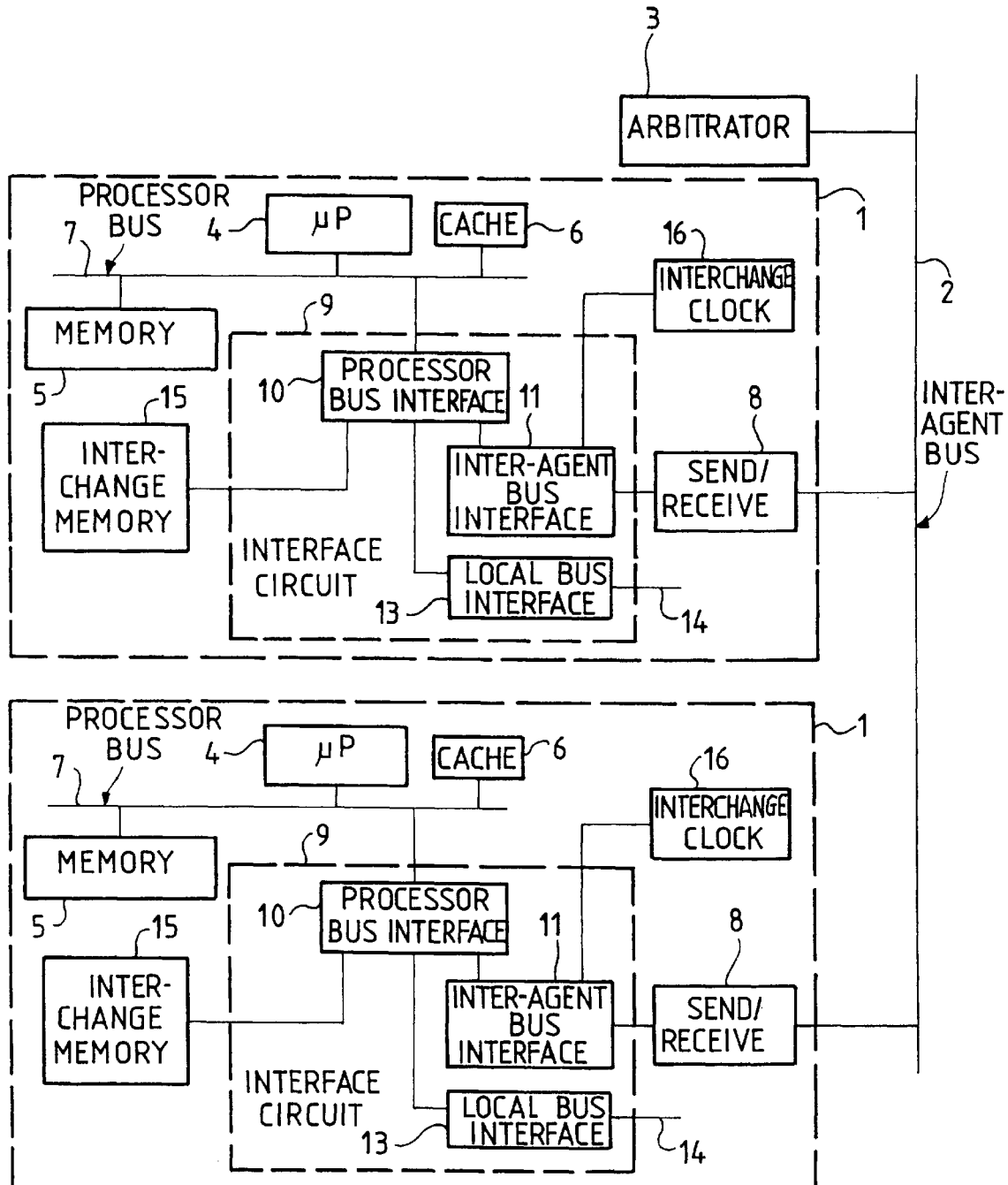
FIG_1

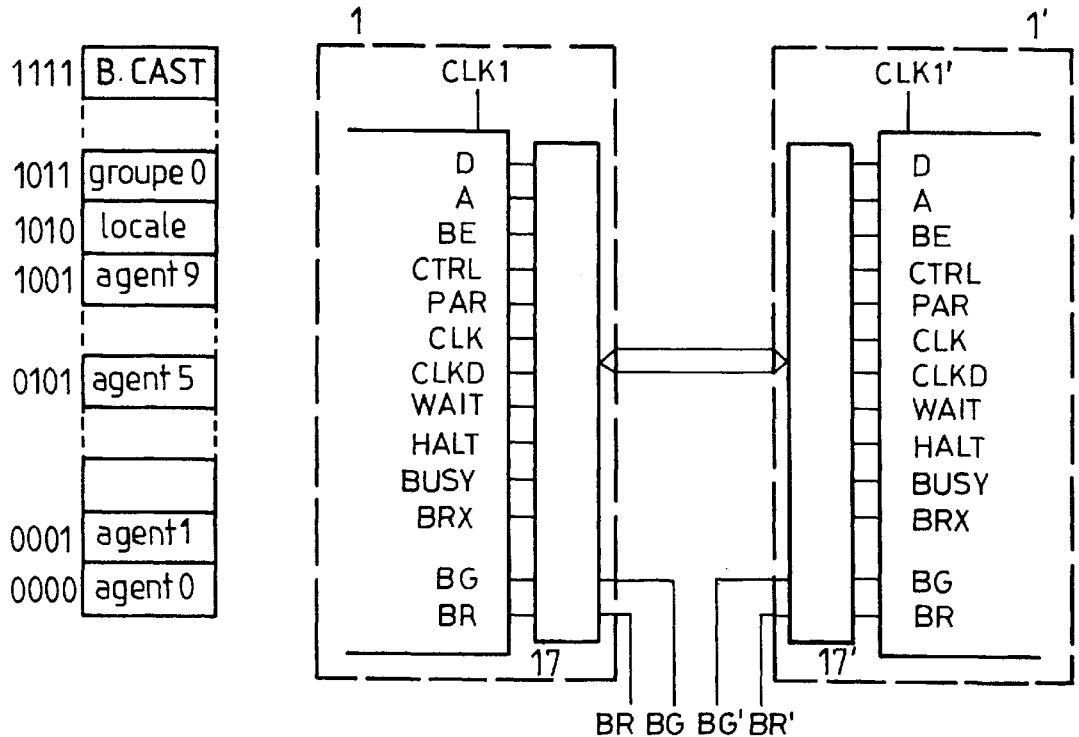

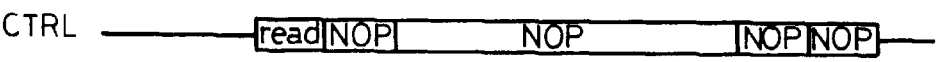

SYSTEM FOR INTERCHANGING DATA BETWEEN DATA PROCESSOR UNITS HAVING PROCESSORS INTERCONNECTED BY A COMMON BUS

The invention relates to a system for interchanging data between data processing units, referred to as "agent units", whose processors are interconnected by a common bus to form an assembly, such as a call processing assembly in a telecommunications exchange, for example, or any other assembly having a plurality of units that may need to accommodate a large amount of data interchange traffic between one another.

BACKGROUND OF THE INVENTION

As is known, the existence of means of ever-increasing performance for taking data into account and for processing it leads to applications being installed which cause ever-increasing volumes of data to be transmitted and processed at ever greater speeds. In particular, processors are using ever-increasing clock frequencies, e.g. about 200 MHz at present, but for reasons associated with physical constraints, such clock frequencies cannot be accepted by transmission links of the kind that can be connected to the input/output ports of the processors. As a general rule, whenever the processors of processor units in a given assembly are intercommunicating, provision is made to use much lower clock frequencies for interchanging data between them. It is therefore necessary to provide special measures for ensuring to as great an extent as possible that the processing capacity of the processors is not limited in practice by the insufficient capacity of the transmission means over which the processors communicate with one another.

In particular, there is a standard that originates from the IEEE known as the "IEEE standard for Futurebus+" concerning interconnection buses between processor units and issued by the IEEE. Nevertheless, because that standard seeks to be universal, it is difficult to obtain physical implementations that are simple and easy to integrate in sub-assemblies which are sometimes already rather complex. This difficulty of implementation applies not only to the bus itself but also to the connectors required for connection to the units that are to be served and to the interchange components of the bus. It is associated in particular with the high number of parallel links included in the bus, with the performance levels required of the various components, and with the constraints associated with the operation of a sub-assembly organized around the bus and the units served thereby.

Document EP 0 646 876 describes a system for interchanging data between data processor units, referred to as "agent units", in which the processors are interconnected by a common bus in an assembly comprising a plurality of units that are expected to accommodate a high level of data interchange traffic between one another. The data processor units comprise processors means, such as processors, which are interconnected by an external interchange bus common to the units, with bus sharing being orchestrated by an arbitrator. Each unit has storage means in which data is stored, at least temporarily, in an organized manner at determined addresses enabling the data to be written and/or read on demand. The data storage means constitute an interchange memory assembly distributed amongst said units, common to all of the units, and accessible by all of them via the interchange bus, each unit having a portion of the storage means of said assembly in the form of an interchange memory which is accessible firstly by the processor means of the unit and secondly by the processor means of the other units via the interchange bus.

However, that document does not deal with transmission and synchronization problems which arise while transferring data from one unit to another. The object of the invention is to solve those problems.

OBJECTS AND SUMMARY OF THE INVENTION

The present invention provides a system for interchanging data between data processor units referred to as "agent" units, the system comprising processor means such as processors which are interconnected by an external multiwire interchange bus common to said units, with bus sharing being orchestrated by an arbitrator, each unit comprising:

means for storing, at least temporarily, data which is conserved in an organized manner at determined addresses enabling the data to be written and/or read on demand, the assembly formed by said units including data storage means constituting an interchange memory assembly shared amongst said units, common to all of said units, and accessible by all of them via the interchange bus; each unit including a fraction of the storage means of said assembly in the form of an interchange memory which is accessible both by the processor means of the unit and by the processor means of the other unit via the interchange bus;

interface means in each unit for the local processor bus and the interchange memory, and for the interchange bus, which interface means are interconnected to interchange data between the storage means constituted by the interchange memory of the unit, the processor means of said unit, and the processor means of other units via the interchange bus to which said other units are connected;

wherein the interchange system comprises intermediate storage means in each unit, between the interchange memory and the interchange bus, said means being constituted by fast access buffer memories to which the processor of the unit can have access at its own clock rate and to which the other units can have access at the rate of the clock then governing said interchange bus; and wherein each unit includes means for generating a first clock signal for transmission over the interchange bus to the other units, and means for recovering a second clock signal from the interchange bus, in order to produce a third clock signal for use in local operations on data suitable for transmission to said unit from another unit, at the rate of the second clock signal.

The data interchange system characterized in this way enables the unit initiating a transaction over the bus to use its own clock for sending, its clock signal being used by the receiver unit for temporarily storing the transaction data in intermediate storage means. The data is subsequently used by means of a local clock, in particular for storing the data in the shared memory. Synchronization between the clocks of the various units is not required. This system can operate at high transfer frequencies, of the order of 50 MHz to 83 MHz, via a backplane bus having a total length of about 50 cm.

BRIEF DESCRIPTION OF THE DRAWINGS

The invention, its characteristics, and its advantages, are described in greater detail in the following description given with reference to the figures listed below.

FIG. 1 is a block diagram of an assembly of data processor units interconnected by a common bus.

FIG. 2 is a diagram showing the organization of an interchange memory of a processor unit.

FIG. 3 is a diagram summarizing the various links provided between any two processor units.

FIGS. 4A–4F are a set of simplified timing diagrams 4A to 4F relating to the transmission of data groups by a unit.

FIGS. 5A–5F are a set of simplified timing diagrams 5A to 5F relating to an operation of a unit restarting transmission.

FIGS. 6A–6G are a set of simplified timing diagrams 6A to 6G relating to a read operation performed by a unit.

MORE DETAILED DESCRIPTION

The assembly shown in FIG. 1 comprises data processor units 1 of agents which are interconnected via a multiwire bus 2 known as an inter-agent interchange bus, with bus sharing being orchestrated by an arbitrator 3. The assembly is shown isolated in this figure but, as a general rule it forms a portion of a larger assembly, e.g. a telecommunications exchange, as mentioned above.

In such a case, the processor units include other links, and for example another bus interconnecting them with other equipment units, but this is not directly related to the subject matter of the invention and is consequently not shown herein.

Each processor unit is conventionally organized around at least one processor 4 assumed to be of high performance, as mentioned above, said processor having at least one memory 5, referred to as a "private" memory, suitable for temporary and/or permanent storage of data in conventional manner, e.g. data such as organized program data, or data that has been processed or that is to be processed, which data is usually organized.

In the embodiment shown in FIG. 1, there can also be seen a cache memory 6 for accelerating various processing operations in a known manner. The memories 5 and 6 communicate with the processor 4 over a bus 7 referred to as a "processor" bus, as is conventional in this field.

The bus 7 is also used for interchanging data between the processor 4 of a processor unit 1 and one or more of the other units 1 connected to the same interchange bus 2, each unit 1 having a send/receive module 8 enabling it to send and receive over said interchange bus. An interface circuit 9 is inserted between the send/receive module 8 and the processor bus 7, and comprises in particular a "processor bus" interface 10, an "inter-agent interchange" bus interface 11, and a "local" bus interface 13. In the embodiment shown, the local bus interface 13 enables data to be interchanged over the local bus 14 by the processor of the unit which includes said bus, and over the interchange bus 2 by the processors of other units. By way of example, the bus 14 serves one or more items of equipment (not shown) that are connected to the unit 1 and that interchange data therewith, e.g. one or more telephone equipments (not shown), or a network access, e.g. giving access to a token ring network or some other kind of network.

The interfaces 10, 11, and 13 serve to ensure that interchange operations take place between the sub-assemblies between which they are inserted by applying control structures, usually of the processor or controller type which govern these sub-assemblies and to which the interfaces are selectively connected according to requirements, as is conventional in this field. The processor bus 7 is designed to accommodate relatively high data rates, and to this end it therefore receives clock signals at a high frequency, e.g. 66 MHz, and in practice it is made to be as short as possible.

The interchange bus 2 is designed to enable information processor units 1 to engage in dialog, e.g. enabling processor or coupler type operation, and to this end they share an "interchange" memory assembly whose component elements are distributed amongst the units 1. The bus is more particularly designed to permit data rates that are compatible with fast processors, for example transmission at clock rates of about 50 MHz.

As is conventional in bus transmission, the data is organized in a determined manner and each data item comprises a plurality of bits, some or all of which correspond to data proper together with additional bits, e.g. for addressing purposes, with each data item for transmission comprising, for example, thirty-two data bits, thirty-two address bits, and additional bits for parity, validation, transaction characterization, etc. purposes.

Given the intended data transfer rates, and for reasons that are known to the person skilled in the art, the number of units 1 connected to an interchange bus 2 is necessarily limited, said number lying, for example, in the range of two to ten in the embodiment described below, and the same necessarily applies to the length of the bus, which bus is implemented, for example, in the form of a multilayer card and extends, for example, over a length of about thirty centimeters.

Each agent unit 1 is carried, for example, on a card which is connected to the multilayer backplane card where the interchange bus 2 is installed, as is conventional in this field. By way of example, the transmitter/receiver module 8 is implemented using backplane transceiver logic (BTL) components which share between them the signals that have been transmitted or that are to be transmitted between the units 1 and between said units and the arbitrator 3. Signals are shared between the various components of a send/receive module on the basis of functional criteria. In a preferred embodiment, provision is made for signals relating to recognizing a destination unit and to the type of transaction intended for a call between units to be processed by a single BTL component in order to enable requests to be processed more quickly. A known mechanism is provided to resynchronize signals coming from a send/receive module 8 and reaching the BTL components constituting it so that data is restored synchronously regardless of which module components are involved.

As mentioned above, data is interchanged between two units 1 via a memory assembly, referred to as an "interchange memory", whose component elements are distributed amongst the units, each unit thus having its own "interchange" memory, given reference 15.

The assembly constituted by an interchange bus 2, its arbitrator 3, and the units 1 connected thereto is organized to enable shared addressing of the memory assembly constituted by the interchange memories 15 of the units, and to enable interchange bus arbitration and data interchange between the units. These interchanges amount to operations of writing in a memory assembly, operations of reading from a memory assembly, and possibly also auxiliary operations, e.g. "latch" operations or "inter-agent interrupt-generating" operations.

As already mentioned, read operations are penalizing in that data transfer speeds over the interchange bus are slow compared with the transfer speeds that the processors can perform. However, write operations are less penalizing insofar as it is possible to provide for the data that is to be transmitted over the interchange bus to be supplied by the processors to fast access buffer memories serving as transmission intermediacies between the processors and the interchange bus.

According to the invention, provision is thus made to maximize processor actions that lead to writing while minimizing actions that lead to reading. Provision is thus made for a unit which has in its possession information that is necessary or useful to other units to communicate the information as soon as possible so as to minimize reads corresponding to requests for such information from said other units.

To this end, the interchange memory 15 of each unit is shared by all of the agents having access to the interchange bus 2, and it is therefore visible to all of the processors 4 in all of the units 1 that are connected to the bus, each agent having a memory zone in the interchange memory 15 of each of the other units, which zone is allocated to the unit corresponding to said agent by software.

In the embodiment described herein, the address giving access to a memory zone reserved for one of the agents is defined by the physical position of the agent, or more precisely the position of the unit 1 corresponding thereto relative to the other units 1 served by the interchange bus 2 in the assembly constituted by said units.

By way of example, a 1 gigabyte memory space is reserved for global addressing of interchange memories in a 4 gigabyte address field, with the 1 gigabyte space being defined, for example, by two bits A0 and A1 defined in 32-bit addressing.

Each agent has reserved thereto an interchange memory zone of a size that lies in the range 8 megabytes to 64 megabytes, for example, and there is room for sixteen logical addressing blocks of up to 64 megabytes each in the above-defined memory space.

Each of the agents, there being no more than ten in the present case, has a logical addressing block allocated thereto as a function of its physical position relative to the other agents, as mentioned above. The physical interchange memory available to each agent is placed at the head of the logical block available to the agent.

The other logical addressing blocks constitute virtual interchange memory blocks and serve in particular for addressing in local access, for addressing for broadcasting to a group, and for addressing for general broadcasting. They may optionally be used by additional agents.

Each agent has local addressing available thereto, which addressing can be performed solely by the processor of the unit 1 of said agent.

Broadcasting can be general and performed from a unit 1 of an agent to all of the others, and it can also be group broadcasting in which case it is performed from one unit to a predetermined group of other units. A given unit may possibly belong to more than one group.

The address bits of a block, which are selected in this example to be the bits A2, A3, A4, and A5, are considered herein as being capable of corresponding either to an address of a block allocated to a particular unit 1, such as the addresses 0000, 0001, 0101, and 1001 in FIG. 2, or else an address of a block allocated to the interchange memory 15 locally in a unit, such as the address 1010, or else a block address for general broadcasting, such as 1111, or for group broadcasting such as 1011. In this case, the local block address such as 1010 is provided to enable the interchange software implemented by each processor 4 of a unit to use the same address for communicating with the interchange memory 15 of the unit regardless of the position of said unit relative to the others along the interchange bus 2.

By way of example, an agent can access the interchange memory 15 of the unit 1 corresponding thereto without going via the interchange bus 2 to which the unit is connected, by using the block address that corresponds to said unit, either by using the local block address or by using a broadcast address for a group to which the unit belongs, possibly a general broadcast group.

Provision is made to enable the units to have write access to the agent addresses and to the general broadcast addresses or the group broadcast addresses of the interchange memory assembly via the interchange bus. However, reading is performed only locally, particularly from the general broadcast addresses or the group broadcast addresses in the interchange memory of a unit, assuming that the unit is part of the corresponding group, and this takes place without going via the interchange bus.

As mentioned above, access to the interchange bus 2 takes place under the control of an arbitrator 3, and arbitration is assumed to be performed in this case in conventional manner by means of commercially available components designed for this purpose and therefore does not need describing in detail herein since it relates only indirectly to the subject matter of the present invention.

In an embodiment, the arbitration process is designed to be asynchronous and leads to the arbitrator 3 receiving requests for temporary reservation of the interchange bus 2 as generated by the units depending on their respective requirements. Each "calling" unit 1 seeking to reserve the bus for its requirements generates its own asynchronous bus request signal BR which it transmits to the arbitrator 3 over an individual wire link in order to receive a bus grant signal BG therefrom, likewise transmitted in individual manner. Such a bus grant signal BG is sent by the arbitrator 3 to the first of the calling units in order of arrival of the respective bus request signals from said units. The unit which receives the bus grant signal BG then becomes the temporary master of the interchange bus 2, either immediately if the bus is free as indicated by a characteristic state of a BUSY signal, or once the interchange bus has been released by the unit which was previously the master thereof and which was previously using it, said release being indicated by a change in state of the BUSY signal generated by the previous master unit in favor of the future master unit. The unit 1 that has become master then cancels its request so as to enable the arbitration process between the remaining calling units to continue.

Data is transmitted over the interchange bus 2 under the control of the unit 1 which is temporarily the master of the bus, which unit 1 has an "interchange" clock circuit 16 for this purpose. Each of the clock circuits 16 in the various units has a respective send clock at a given frequency which is preferably the same for all of the units, and a clock recovery module for recovering the clock frequency governing data received from another unit. In the embodiment described herein, the clock signals supplied by the unit 1 which is master for the time being of the interchange bus 2 are taken into account by the units 1 with which it is communicating, said units synchronizing themselves on said signals. This serves in particular to enable each unit 1 to accommodate the dispersions arising from the different transmission lengths due to their respective positions along the interchange bus.

The links required for transmitting data between the units via the interchange bus 2 are shown symbolically in FIG. 3 for two such units referenced 1 and 1'.

The various links making up the interchange bus 2 have their ends connected to specialized terminating circuits 17 and 17', e.g. constituted by FUTUREBUS FB1651 components which include bothway buffer registers that can be sampled and which enable a determined number of signals to be processed in parallel. In this case it is assumed that these terminating circuits 17 are implemented for signal transfer purposes in each unit 1, such as the units 1 and 1' of FIG. 3. In this case, the signals are as follows:

n data signals D;

m corresponding address signals A, where n is equal to thirty-two and m to thirty in a particular embodiment;

p data write enable signals BE, with p being equal to four, for example, since the data bits are grouped into 8-bit bytes;

q control signals CTRL characterizing the type of transaction requested, with q being equal, for example, to four and enabling writing or reading of data to be identified where the data is grouped in separable or in inseparable manner, e.g. in words of thirty-two bits, by word group and by function or position characteristic;

r parity signals PAR relating to at least some of the other transmitted signals, and in particular to the enable signals BE;

a clock signal CLK generated by the send clock of the master unit 1 to clock the sending of address signals, of the q control signals CTRL, and of the parity signals relating to the preceding signals, said signal also clocking the n data signals, the p data enable signals, and the corresponding parity signals when writing, said clock signal being sent over the bus together with said various signals;

a clock signal CLKD for synchronizing the bus on reception, said signal corresponding to the receive level of the clock signal CLK sent by the bus master; and a wait signal WAIT and a stop signal HALT sent by a destination unit respectively when its ability to receive is temporarily in danger of becoming insufficient, and when said unit is incapable of processing data.

Each of the units 1 or 1' generates send clock signals referenced CLK or CLK' depending on the unit, and each communicates with the arbitrator via request signals BR or BR', said arbitrator responding with individual grant signals BG or BG' as described above. A request-present signal BRX is also transmitted to the unit, and in particular to the current master unit of the interchange bus in order to inform it whether or not there exists a request that comes from some other unit.

Writing is performed in the interchange memory assembly at the clock rate of the send clock generated by the agent unit to which mastery of the interchange bus 2 has just been granted by the arbitrator 3 (assumed to be unit 1 in timing diagram 4A), said clock being referenced CLK1 in timing diagram 4A. As mentioned above, it is a change of state in the BUSY signal that indicates that the interchange bus 2 is available and that enables a write operation to begin. The synchronization signal CLK sent by a unit for a write operation is constituted by the clock signal CLK1 supplied by the unit 1 which has become master of the interchange bus as soon as the state of the BUSY signal makes this possible, with changes in the state of the BUSY signal being shown in timing diagram 4B. A delay corresponding to one cycle of the clock signal can be provided, for example, before the clock signal CLK appears after a change in the state of the BUSY signal.

The reception of the synchronization clock signal CLKD by a destination unit, e.g. 1', is used by said unit for writing data into buffer memories situated in the processor bus and interchange memory interface 10, and in the inter-agent interchange bus interface 11. The clock CLKD is obtained, for example, using a conventional clock recovery circuit.

The presence of first-in-first-out (FIFO) type buffer memories in the receiving portion of the destination unit makes it possible for the signals received from the sending unit 1 to be taken into account for such recovery, which signals are stored in the buffer memories while waiting for access to become available to the interchange memory.

The address bits A, the data bits D, the sent data enable bits BE, and the parity bits PAR are then received in parallel by the destination unit 1' via parallel connections reserved for said bits in the interchange bus 2, and they are received in groups corresponding to the intended type of transaction, such as data group i1, as shown in timing diagram 4E. A plurality of data groups such as i1, i2, i3 and i4 can be transmitted in succession without interruption if they are waiting in the send unit 1 and providing no WAIT or HALT signal has been received by said unit. As already mentioned above, a WAIT signal is transmitted to a unit that is in the process of sending by a unit which is then receiving in the event of the receive data storage capacity of said receiving unit being in danger of becoming saturated temporarily if the sending unit continues to send new data. There is then a pause in sending so as to allow the destination unit which issues the WAIT signal to catch up.

Timing diagrams 5A to 5F show examples of operations in which the process is influenced by changes in the state of the WAIT signal, where the WAIT signal in this case is of the asynchronous type.

As soon as the WAIT signal returns to a rest state after being released by a destination unit that is no longer overloaded, the unit which is then master of the interchange bus 2 and which has maintained the BUSY signal, continues with the previously-interrupted write operations, as shown by timing diagrams SA to SF. This restarting of write operations is assumed to take place one clock cycle after the change in state of the WAIT signal.

If a new interruption of sending is requested by the destination unit causing the WAIT signal to change state again, then the change of state is again transmitted to the unit that is currently master of the interchange bus 2, which unit again stops sending new current data in the most recent data group, such as the group i3 immediately following the groups i1 and i2 in the example described. In the embodiments considered herein, the data group i3 continues to be produced, but it is no longer taken into account by the destination unit insofar as the control signal CTRL which it also receives from the master unit is no longer a function code requesting a write operation but now corresponds to a no operation (NOP) function code informing all destination units that the data group currently being sent is not to be taken into account.

When the WAIT signal returns to its rest state after being released by the previously overloaded destination unit, as already described, the unit that is presently master of the interchange bus continues with the previously interrupted write operations by sending again the most recently sent data group, in this case the group i3 accompanied by a NOP function, prior to sending any other group, in this case i4. Watch dogs are also provided as is conventional in this context to prevent the interchange bus 2 becoming blocked by one of the units connected thereto in the event of a hardware or software failure.

The signal BRX also enables a unit which is temporarily master to continue as master of the interchange bus providing no other request for mastery of the bus is pending at that time. This makes it possible, in particular, for a unit to continue being master of the interchange bus 2 for a monologue that might be lengthy, without pointless intervention from the arbitrator 3, e.g. when downloading from the master unit or if the data rate is sporadic and very low.

The maximum data rate of a write unit implies no overlap between arbitration cycles and data transmission cycles over the interchange bus 2. The total time to be taken into consideration for determining the minimum time and the maximum time possible corresponds to the sum of the times that the interchange bus is engaged, the times required for resynchronizing the destination unit on the clock of the new master, one clock cycle of the new master in order to prepare the group of bits corresponding to the first data item, and one master clock cycle for sending said first data item. Each new data item sent in succession adds one more master clock cycle. Depending on the positions of the units along the interchange bus, there will necessarily be dispersion between the minimum and maximum times. It should be observed that because of the possibility of sending data in bursts, the greater the loading, the higher the performance of the data transmission, since data rate adapts progressively to data loading by increasing with increasing load.

The maximum data rate of the interchange bus for writing is determined in corresponding manner, and the total time to be taken into account for determining the minimum and maximum possible times is equal to the sum of a BUSY signal release time, the resynchronization time, one master clock cycle for preparing the group of bits corresponding to the first data item, and one clock cycle per data item sent in succession.

Reading from the interchange memory assembly also takes place at the rate of the send clock CLK1 as generated by the agent unit that is currently master of the interchange bus 2, said unit again being assumed to be the unit 1 in timing diagram 6A. This master unit issues a control signal CTRL corresponding to a read instruction as shown in timing diagram 6C, and a signal A that defines a read address adr, as shown in timing diagram 6D, as soon as this is made possible by the state of the BUSY signal, or by a change in state thereof, as shown by timing diagram 6B. In this case, the read order is immediately followed by a succession of NOP codes until a result has been obtained from the requested read operation.

The synchronization and clock signal CLKD received from the master unit by the destination unit is used by the destination unit to recover the read order and the address at which reading is to be performed in the interchange memory 15 of the destination unit, assuming that reading is to take place in the interchange memory. A data signal D corresponding to the data that is to be found at the specified address in the interchange memory 15, and a corresponding bus enable signal BE are then issued by the destination unit of the read order together with a synchronization signal CLK' coming from the clock CLK of the unit 1', as shown in timing diagrams 6E to 6G. In the embodiment shown, data obtained by reading at a data address is present for one clock cycle on the wires of the interchange bus over which it is transmitted. The number of synchronization signals supplied by the destination unit is a function of the type of transaction requested by the master unit, for example a 4-bit CTRL code of value 0010 if reading of a single 32-bit word has been requested, or a CTRL code of value 0011 if two 32-bit words are to be read, etc.

In a preferred embodiment, provision is made for a read request to be capable of being implemented by the unit that is temporarily the master unit only from the moment when it has already performed all of the write operations that it was waiting to send. Similarly, a destination unit cannot read from the interchange memory until the moment it has already performed all of the pending write operations in the interchange memory coming from the interchange bus 2.

The maximum data rate of a read unit requires account to be taken of the total time obtained by summing the time required for seizing the interchange bus, the resynchronization time, one master clock cycle for preparing the group of bits corresponding to the read request, one master clock cycle for sending said group of bits, the time required for transmitting said group of bits together with the signal that accompanies it, the time required for recovering a read request by the unit to which the request has been sent, the resynchronization time, the arbitration time (not shown) for a bus giving access to the interchange memory, the time required for reading the data item addressed in the interchange memory containing it, the time required for the processing controller to perform a read operation, the time required for resynchronization on the send clock CLK of the destination, the time required to transmit the data item and the accompanying clock signal, and optionally the time required by the master unit for resynchronizing the group of bits constituting the data item.

What is claimed is:

1. A system for interchanging data between data processor units referred to as "agent" units, the system comprising processor means such as processors which are interconnected by an external multiwire interchange bus common to said units, with bus sharing being orchestrated by an arbitrator, each unit comprising:

means for storing, at least temporarily, data which is conserved in organized manner at determined addresses enabling the data to be written and/or read on demand, the assembly formed by said units including data storage means constituting an interchange memory assembly shared amongst said units, common to all of said units, and accessible by all of them via the interchange bus; each unit including a fraction of the storage means of said assembly in the form of an interchange memory which is accessible both by the processor means of the unit and by the processor means of the other unit via the interchange bus;

interface means in each unit for the local processor bus and the interchange memory and for the interchange bus, which interface means are interconnected to interchange data between the storage means constituted by the interchange memory of the unit, the processor means of said unit, and the processor means of other units via the interchange bus to which said other units are connected;

wherein the interchange system comprises intermediate storage means in each unit, between the interchange memory and the interchange bus, said means being constituted by fast access buffer memories to which the processor of the unit can have access at its own clock rate and to which the other units can have access at the rate of the clock then governing said interchange bus; and wherein each unit includes means for generating a first clock signal for transmission over the interchange bus to the other units, and means for recovering a second clock signal from the interchange bus, in order to produce a third clock signal for use in local operations on data suitable for transmission to said unit from another unit, at the rate of the second clock signal.

2. A system according to claim 1, wherein the interchange memories which form the interchange memory assembly are logically organized in blocks that are individually allocated to units constituted in particular by units and groups of units, possibly together with a group including all of the units.

3. A system according to claim 1, wherein the address of an interchange memory of a unit in the interchange memory assembly is defined by the position of the unit relative to the other units along the interchange bus.

4. A system according to claim 1, wherein data interchanges take place therein at the initiative of a unit then requesting data transfer and that has, at that time, had mastery of the interchange bus allocated thereto by the arbitrator, and which imposes the first clock signal as produced thereby as soon as that is made possible by the state of an interchange bus busy signal or a change of state therein, which signal is temporarily under the control of a unit while said unit is indeed master of the bus, said first clock signal being used by the master unit which produces it to transmit at least one data item made up of a plurality of bits via the interchange bus for read or write purposes in at least one of the interchange memories of the interchange memory assembly.

5. A system according to claim 4, wherein at least the first data item transmitted over the interchange bus by a unit that has temporarily become master of said interchange bus includes bits corresponding to a control signal characteristic of the type of transaction then being imposed for data transfer purposes.

6. A system according to claim 4, wherein a wait signal or a stop signal can be transmitted to the master unit by a data destination unit while data is being transmitted by said master unit, respectively either when the data reception capacity of said destination unit has temporarily become insufficient, or else when said destination unit is incapable of taking the data into account.

* * * * *